No. 618,900. Patented Feb. 7, 1899.
W. V. OAKEY.
TOBACCO HARVESTER.
(Application filed Sept. 20, 1898.)
(No Model.)
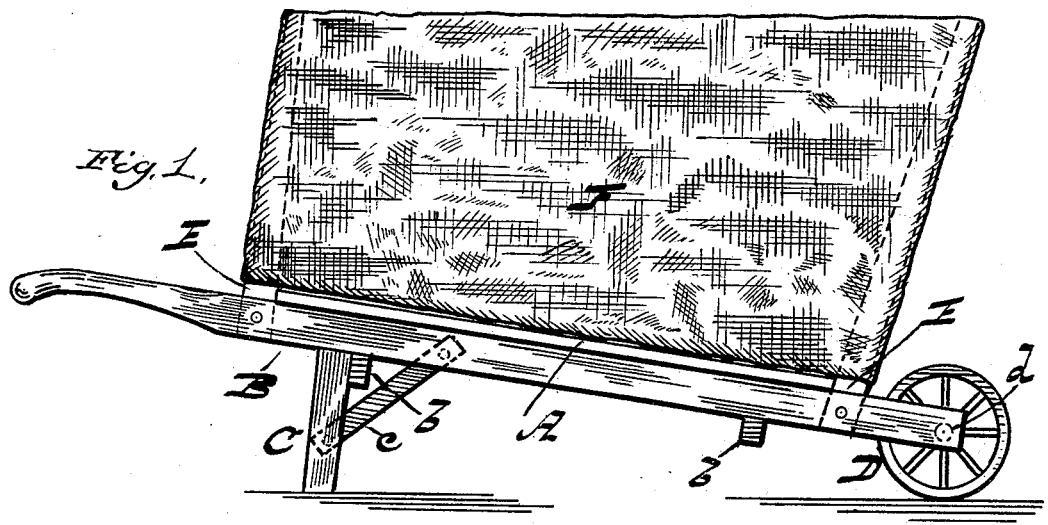
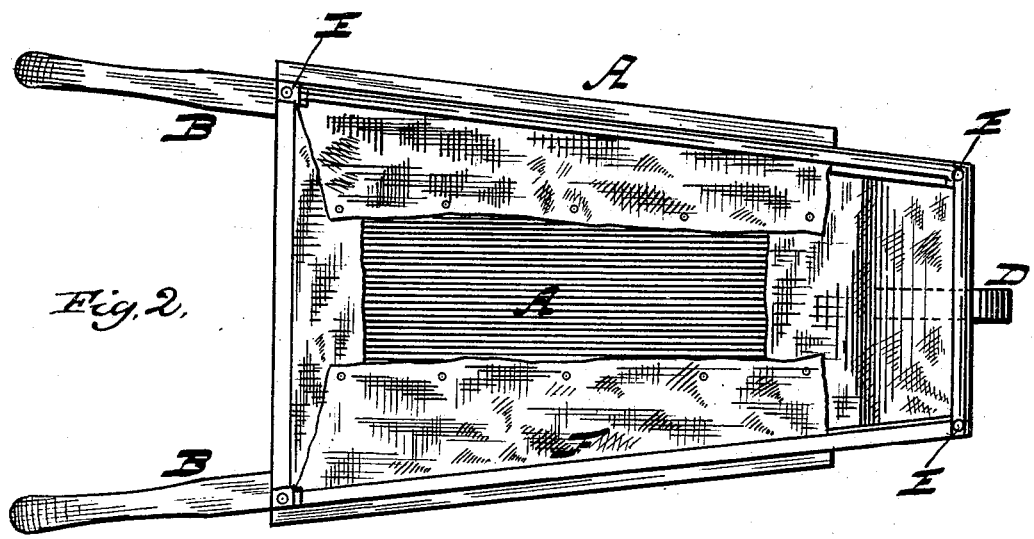
WITNESSES
Wm H Bates
E H Bates
INVENTOR
Wm V Oakey
By T M Arrington
Attorney
THE NORRIS PETERS CO., PHOTO-LITHO., WASHINGTON, D. C.

UNITED STATES PATENT OFFICE.

WILLIAM V. OAKEY, OF RED OAK, NORTH CAROLINA, ASSIGNOR OF ONE-HALF TO JAMES R. PROCTOR, OF SAME PLACE.

TOBACCO-HARVESTER.

SPECIFICATION forming part of Letters Patent No. 618,900, dated February 7, 1899.

Application filed September 20, 1898. Serial No. 691,427. (No model.)

*To all whom it may concern:*

Be it known that I, WILLIAM V. OAKEY, a citizen of the United States, residing at Red Oak, in the county of Nash and State of North Carolina, have invented certain new and useful Improvements in Tobacco-Harvesters; and I do hereby declare the following to be a full, clear, and exact description of the invention, such as will enable others skilled in the art to which it appertains to make and use the same.

My invention relates to improvements in tobacco-harvesters; and it consists in certain details of construction, which will be hereinafter described in the specification, illustrated in the drawings, and specifically pointed out in the claim.

The object of my said invention is to provide a device whereby the leaves of tobacco can be gathered from the growing plants and transported to the drying-house without danger of breaking the harvested leaves or injuring the growing plants as the vehicle is propelled between the rows of the field of tobacco.

In the drawings which fully illustrate my invention, Figure 1 is a side elevation of the device having my improvements applied thereto. Fig. 2 is a plan view of the same.

A designates a frame or bottom constructed of wood or metal, nearly rectangular in shape, secured on the top of a pair of handle-bars B, which are arranged to slightly approach each other from rear to front, and connected by cross-braces *b*. They are also provided, about one-third of the distance from the handled ends, with supports or legs C, which elevate the bars a suitable distance from the ground. *c* designates diagonal metal braces which secure the legs to the handle-bars. At the front ends is journaled the axle *d* of a wheel D.

The rear ends of the bars B are provided with handles, by which the machine is propelled between the rows of growing plants. Secured in mortises in the handle-bars, at each corner of the bottom or bed of the harvester, is an upright E, which several uprights are inserted in a slightly-flaring position and serve to retain a canvas sack or body F, which surrounds the uprights and forms the receptacle of the harvester.

The canvas receptacle, while it retains the gathered leaves of tobacco, is so yielding at its sides and ends as to prevent the breaking of the leaves placed within it, as well as precluding injury to the growing plants as the harvester is propelled between the rows of plants in the process of gathering the leaves.

Having thus fully described my invention, what I claim therein as new, and desire to secure by Letters Patent, is—

In a tobacco-harvester, the combination of the handle-bars arranged to approach each other from rear to front having the cross-braces; the single wheel, with its axle journaled in the front ends of the handle-bars; short legs secured by braces to the under surface of the bars; a bed or bottom secured to the upper surface of the bars; flaring uprights rising from the bars at each corner of the bed; and a canvas receptacle inclosing the flaring uprights, and secured to them and to the bed or bottom all substantially as described.

In testimony whereof I affix my signature in presence of two witnesses.

his
WILLIAM V. × OAKEY.
              mark

Witnesses:
   B. H. SORSBY,
   J. H. T. BAKER.